United States Patent
Hagen

(10) Patent No.: US 9,441,582 B2
(45) Date of Patent: Sep. 13, 2016

(54) DEVICE FOR COOLING AND CONDENSING FUEL VAPORS

(75) Inventor: Harald Hagen, Creussen (DE)

(73) Assignee: AUDI AG, Ingolstadt (DE)

( * ) Notice: Subject to any disclaimer, the term of this patent is extended or adjusted under 35 U.S.C. 154(b) by 1015 days.

(21) Appl. No.: 13/328,257

(22) Filed: Dec. 16, 2011

(65) Prior Publication Data

US 2012/0152489 A1     Jun. 21, 2012

(30) Foreign Application Priority Data

Dec. 21, 2010   (DE) .................. 10 2010 055 315

(51) Int. Cl.
*B60H 1/00*     (2006.01)
*F28D 15/00*    (2006.01)
*F02M 33/08*    (2006.01)
*F02M 25/08*    (2006.01)
*F02M 31/20*    (2006.01)

(52) U.S. Cl.
CPC ........... *F02M 33/08* (2013.01); *F02M 25/089* (2013.01); *F02M 31/20* (2013.01); *Y02T 10/126* (2013.01)

(58) Field of Classification Search
CPC ........... F28D 15/0266; F28D 15/0233; F28D 15/0275; F02M 31/005; F02M 31/20; F02M 25/0854; F02M 25/0872; F02M 25/089; F02M 2025/0863; F02M 2025/0881
USPC ............. 165/41, 51, 59, 104.21–104.26, 165/128–130; 123/516, 518, 519; 220/746, 220/748, 749
See application file for complete search history.

(56) References Cited

U.S. PATENT DOCUMENTS

| | | | | |
|---|---|---|---|---|
| 4,072,138 A | * | 2/1978 | Hawkins et al. | 123/552 |
| 4,098,236 A | | 7/1978 | Okawa | |
| 4,279,294 A | * | 7/1981 | Fitzpatrick et al. | 165/45 |
| 4,671,071 A | * | 6/1987 | Sasaki | 62/47.1 |
| 4,702,225 A | * | 10/1987 | Heffernan et al. | 126/116 A |
| 4,732,588 A | * | 3/1988 | Covert et al. | 96/144 |
| 4,773,473 A | | 9/1988 | Konitzer | |
| 4,883,943 A | | 11/1989 | Davis | |
| 5,054,453 A | * | 10/1991 | Onufer | 123/516 |
| 5,269,837 A | * | 12/1993 | Ohashi et al. | 96/126 |
| 5,897,690 A | * | 4/1999 | McGrew | 95/188 |
| 6,439,277 B1 | * | 8/2002 | Kyburz | 141/98 |
| 7,021,295 B2 | * | 4/2006 | Aschoff et al. | 123/516 |
| 7,377,294 B2 | | 5/2008 | Handa | |
| 7,946,277 B2 | * | 5/2011 | Essig | 123/516 |

FOREIGN PATENT DOCUMENTS

| | | |
|---|---|---|
| CN | 1461725 | 12/2003 |
| CN | 1461725 A | 12/2003 |
| CN | 201202601 | 3/2009 |
| CN | 201202601 Y | 3/2009 |

(Continued)

*Primary Examiner* — Travis Ruby
(74) *Attorney, Agent, or Firm* — Henry M. Feiereisen LLC

(57) ABSTRACT

A device for cooling fuel for an internal combustion engine, includes a heat pipe, which includes an evaporation zone and a condensation zone. To decrease the amount of gaseous hydrocarbons conducted into an activated carbon filter of a tank ventilation device of a tank of the internal combustion engine, and thereby avoid undesired bleed-emission or an enlargement of the activated carbon filer, the evaporation zone of the heat pipe is in thermal contact with fuel vapors, to condense part of the fuel vapors before the hydrocarbons contained therein can enter the activated carbon filter.

3 Claims, 3 Drawing Sheets

(56) References Cited

FOREIGN PATENT DOCUMENTS

| | | |
|---|---|---|
| DE | 38 05 581 A1 | 9/1988 |
| DE | 202005018178 | 3/2006 |
| DE | 102008027871 | 12/2009 |
| EP | 0 211 419 A2 | 2/1987 |
| EP | 1 063 117 | 12/2000 |
| EP | 1 063 117 A2 | 12/2000 |
| JP | S 63280846 A | 11/1988 |
| JP | 2000-8982 | 1/2000 |
| JP | 2001-200696 | 7/2001 |

* cited by examiner

DEVICE FOR COOLING AND CONDENSING FUEL VAPORS

CROSS-REFERENCES TO RELATED APPLICATIONS

This application claims the priority of German Patent Application, Serial No. 10 2010 055 315.8, filed Dec. 21, 2010, pursuant to 35 U.S.C. 119(a)-(d).

BACKGROUND OF THE INVENTION

The invention relates to a device for cooling and condensing fuel vapors for an internal combustion engine.

From EP 0 211 419 A2 a device of the aforementioned type is known which has a heat pipe whose evaporation zone is arranged in a chamber in a return line circulated by fuel, between the internal combustion engine and a fuel tank, which, however, can alternatively also be provided in the fuel tank or at the entrance of a pre-feed pump to cool the liquid fuel located there.

In internal combustion engines the fuel tank heats up when ambient temperatures rise. This leads to increased outgassing of more volatile hydrocarbons from the liquid fuel, which results in an increased gas pressure in the fuel tank. To avoid that the gas pressure reaches critical values, a tank ventilation valve is usually provided which opens when the gas pressure exceeds a predetermined threshold value. To avoid leaking of gaseous hydrocarbons (HC) into the environment, legislation requires an activated carbon filter to be provided between the tank ventilation valve and the environment. The activated carbon filter has the purpose to adsorb hydrocarbons contained in the gas mixture which leaks through the tank ventilation valve, so that only air can escape into the environment. To maintain the adsorption capacity of the activated carbon filter, the latter must be regularly regenerated by aspirating ambient air through the activated carbon filter into the intake tract of the internal combustion engine during operation of the internal combustion engine, to flush the activated carbon filter clear of hydrocarbons and to conduct the hydrocarbons together with the aspirated air into the combustion chambers of the internal combustion engine for combustion.

When a motor vehicle is exclusively driven by means of an internal combustion engine or as in the case of a hybrid vehicle alternately by an internal combustion engine and an electric motor, the activated carbon filter can be regenerated regularly, because the internal combustion engine is operated frequently. In contrast, electromotive operation predominates in so called plug-in motor vehicles with an electric motor which serves as driving engine, and an internal combustion engine which is carried along only as auxiliary motor and only serves for charging the vehicle batter. In these motor vehicles this can cause an activated carbon filter which is loaded with a greater amount of hydrocarbons not to be regenerated over an extended period of time. In turn, this can lead to bleed emissions, which means an undesired leaking of hydrocarbons from the activated carbon filter into the environment, as a result of diffusion processes. To avoid this, the activated carbon filter could be dimensioned larger which is, however, disadvantageous with regard to installation space and costs.

SUMMARY OF THE INVENTION

Taking the foregoing into account, the invention is based on the object to improve a device of the aforementioned type such that the amount of gaseous hydrocarbons conducted into the activated carbon filter can be decreased, to avoid undesired bleed emissions or an enlargement of the activated carbon filter.

This object is solved according to the invention in that the evaporation zone of the heat pipe is in thermal contact with fuel vapors, to condense the latter, before the hydrocarbons contained therein can enter the activated carbon filter.

The invention is based on the idea, to condense gaseous hydrocarbons by dissipating heat by the heat pipe, to prevent entering of the hydrocarbons into the activated carbon filter.

Because the hydrocarbons which outgas from the fuel accumulate in particular above the fuel level in the fuel tank, in a preferred embodiment of the invention the evaporation zone of the heat pipe is also arranged at this site i.e. in the interior of the fuel tank and above the fuel level of the fuel in the fuel tank. On one hand this has the advantage that fuel vapors which condense on the outside of the evaporation zone of the heat pipe which is located above the fuel level, can drip directly into the fuel in the tank. On the other hand, the heat pipe can be led out of the fuel tank through an opening which is usually provided on the top side of the fuel tank and is closed by a lid, and can be arranged in a region of the motor vehicle of lower ambient temperature. As a result, the condensation zone is located outside of the fuel tank at a higher level than the evaporation zone inside the fuel tank, so that on one hand, the work or heat transfer medium in the interior of the heat pipe flows back into the evaporation zone supported by its gravity, and on the other hand, the rising of the work or heat transfer medium which evaporates in the evaporation zone is supported by convection.

However, the evaporation zone of the heat pipe can also be integrated into a boundary wall of the fuel tank or in a lid for closing an opening of the fuel tank such that a thermal contact with the fuel vapors in the fuel tank is ensured.

Expediently, the evaporation zone of the heat pipe is arranged at a site at which the temperature at least during operation of the internal combustion engine and preferably also during standstill of the internal combustion engine is lower than the temperature of the fuel vapors to be condensed or the evaporation zone, respectively, so that a heat transport from the evaporation zone to the condensation zone occurs in the heat pipe. In motor vehicles, sites are preferred at which the airstream or the fan air of an air conditioner which operates in the cooling mode flows past the heat pipe. To improve the heat transfer from the heat pipe to the airstream or the fan air, the heat pipe can be provided with cooling fins in the region of the condensation zone.

In another embodiment of the invention on the other hand, the entire heat pipe is arranged within the fuel tank such that the evaporation zone is located in the upper portion of the fuel tank and the condensation zone is located near a bottom of the fuel tank where it is surrounded by the liquid fuel. Since the fuel tank of a motor vehicle as a result of the different insulation by the car body, mostly does not heat up uniformly from all sides when ambient temperatures rise, a temperature gradient often forms within the fuel, at least during heating up of the fuel tank, wherein the fuel is hottest near the fuel surface and coolest near the bottom of the fuel tank. This temperature gradient can be used to condense part of the fuel vapors above the fuel level in the fuel tank, by conducting heat from the evaporation zone located in this region to the condensation zone of the heat pipe located near the bottom of the fuel tank, by means of the heat pipe. In this case, however, a heat pipe with a wick has to be used to transport the heat transfer medium which is located inside the heat pipe and is condensed in the condensation zone, to the top again into the evaporation zone by capillary forces.

In a yet further advantageous embodiment of the invention, the evaporation zone of the heat pipe is arranged along a tank ventilation line which leads from a fuel tank of the internal combustion engine to an activated carbon filter, and preferably tank-side of a tank ventilation valve, which is arranged in the tank ventilation line, where it is in thermal contact with fuel vapors. Expediently, the tank ventilation line is arranged such that it steadily ascends from the fuel tank up to the evaporation zone of the heat pipe so that the fuel which evaporates in the evaporation zone of the heat pipe flows back into the fuel tank by itself due to its gravity.

This embodiment achieves on one hand, that when the tank ventilation valve is open, part of the fuel vapors which flow from the fuel tank to the activated carbon filter are condensed before reaching the activated carbon filter and flow back into the fuel tank through the tank ventilation line, thus reducing the loading of the activated carbon filter. When the tank ventilation valve is closed, part of the fuel vapors in the fuel tank also reach the evaporation zone of the heat pipe through the tank ventilation line by diffusion and/or convection, from where the condensed liquid fuel can flow back into the fuel tank through the tank ventilation line.

To improve the heat transfer between the evaporation zone of the heat pipe and the fuel vapors within the tank ventilation line, the latter can, at least in the region of the evaporation zone, be made of metal and advantageously be surrounded by the evaporation zone of the heat pipe.

To improve the separation of the condensed liquid fuel from the fuel vapors, the evaporation zone of the heat pipe can be part of a liquid trap, in which the condensed fuel is conducted into a separate chamber, from which it can be conducted back again into the fuel tank. Especially in the case of an opened tank ventilation valve this prevents the condensed liquid fuel from being carried along by the gas mixture in the form of small droplets in the direction of the activated carbon filter. The liquid fuel can either be conducted back into the fuel tank by the tank ventilation line, for example by opening an outlet of the chamber to the tank ventilation line when closing the tank ventilation valve, or on a separate path, for example through a separate fuel line or by mounting a liquid trap on the top side of the fuel tank and conducting the liquid fuel from the liquid trap through a tank opening back into the fuel tank.

BRIEF DESCRIPTION OF THE DRAWING

In the following, the invention is explained in more detail by way of several exemplary embodiments shown in the drawing. It is shown in.

DETAILED DESCRIPTION OF PREFERRED EMBODIMENTS

Figure 1:
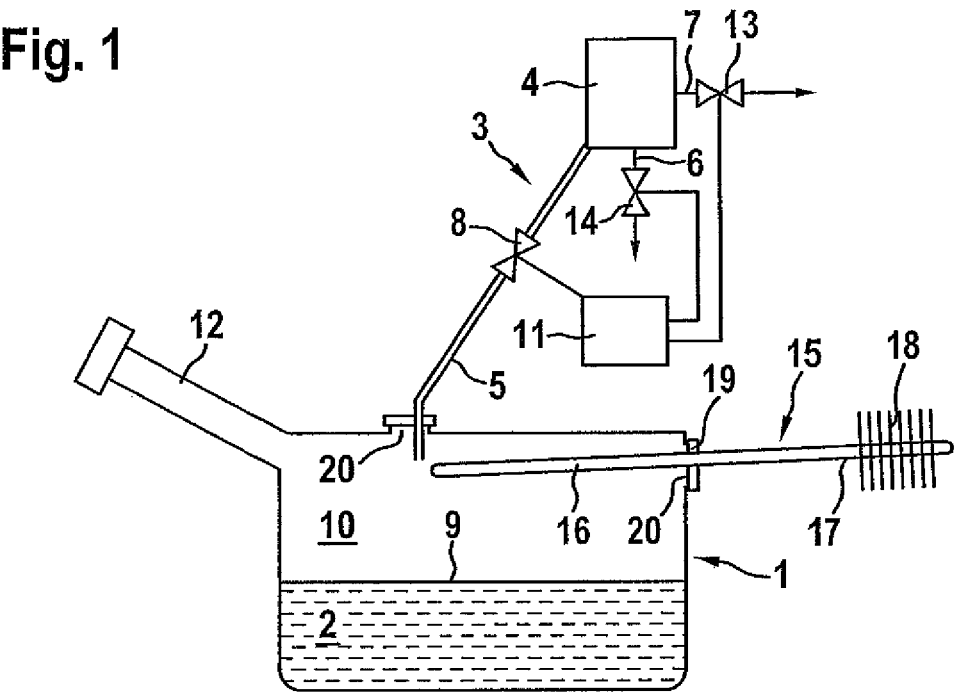
FIG. 1 a schematic view of a fuel tank of a motor vehicle with a tank ventilation device and a heat pipe for condensing fuel vapors in the fuel tank.

In the exemplary embodiments shown in the drawing, a pressure-tight closed fuel tank 1 of a motor vehicle serves for receiving gasoline, which is conducted from the fuel tank 1 to an internal combustion engine (not shown) of the motor vehicle.

In order to reduce the gas pressure resulting from an outgassing of liquid fuel 2 in the fuel tank 1, without fuel vapors leaking into the environment, the fuel tank has a tank ventilation device 3. The tank ventilation device 3 includes an activated carbon filter 4, which is connectable to the fuel tank by a tank ventilation line 5, to a intake manifold (not shown) of the internal combustion engine by a regeneration line 6, and to the environment by a ventilation line 7.

A controllable tank ventilation valve 8 is inserted into the tank ventilation line 5. The tank ventilation valve 8 is constructed as pressure valve, which opens automatically, when the gas pressure in the fuel tank 1, for example as a result of an increase of the ambient temperature, exceeds a predetermined threshold value, to conduct part of the gas mixture which is contained in a gas volume 10 of the fuel tank 1 above the fuel surface 9 through the activated carbon filter 4 into the environment while retaining the fuel vapors in the activated carbon filter 4. In addition, the tank ventilation valve 8 is opened by a control unit 11, when the fuel tank 1 is refueled with fuel through a filler neck 12, to prevent leakage of fuel vapors through the filler neck 12.

Also inserted into the ventilation line 7 is a controllable pressure valve 13 is which opens automatically, when the gas pressure in the activated carbon filter 4 rises when opening the tank ventilation valve 8. Further, the pressure valve 13 on one hand is opened along with the tank ventilation valve 8 when refueling the fuel tank 1, and on the other hand during a regeneration of the activated carbon filter 4.

A controllable valve 14 is inserted into the regeneration line 6, which is opened in defined operating conditions in a pulsed manner together with the pressure valve 13 in the ventilation line 7, to aspirate ambient air through the activated carbon filter 4 and the intake manifold for combustion in the internal combustion engine.

Figure 2:
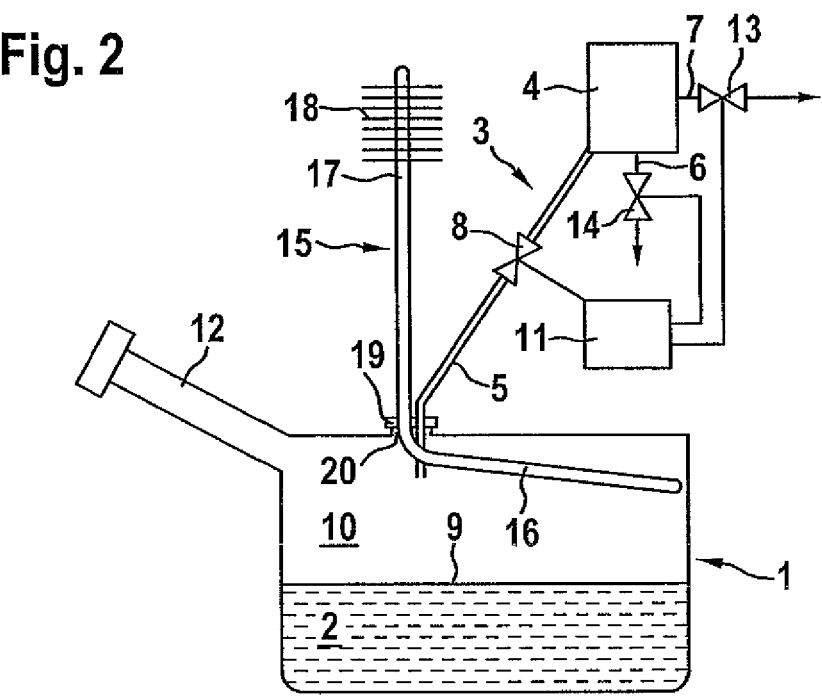
FIG. 2 a schematic view according to FIG. 1, however, with a different arrangement of the heat pipe.
Figure 3:
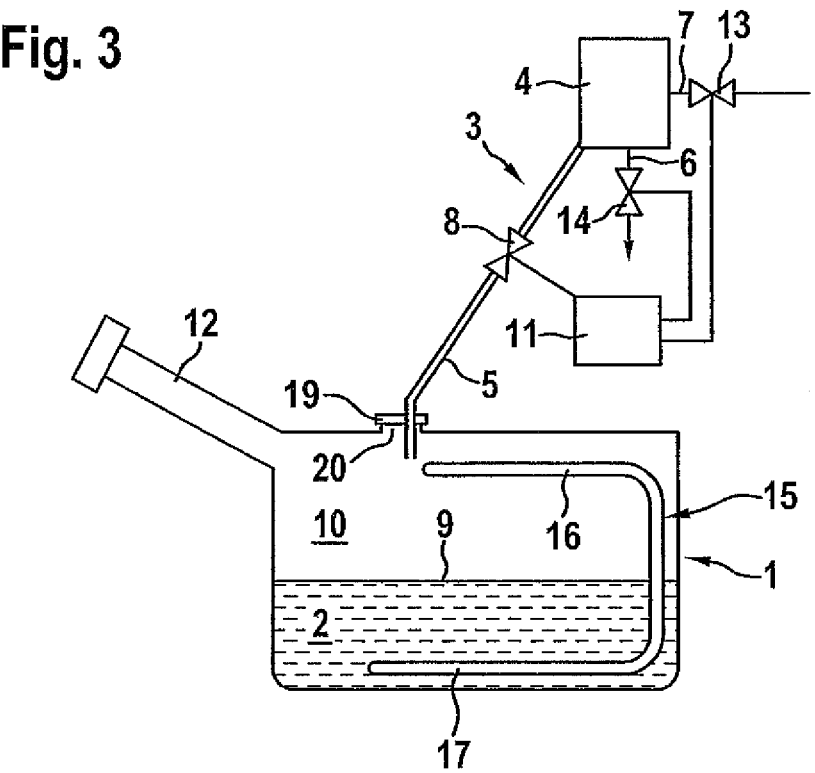
FIG. 3 a schematic view according to FIGS. 1 and 2, however, with yet a different arrangement of the heat pipe.

To decrease loading of the activated carbon filter 4 with hydrocarbons and thereby allow extending the time period between successive regeneration processes of the activated carbon filter without the risk of bleed emission or to decrease the required size of the activated carbon filter 4, the fuel tank 1 of the exemplary embodiments in the FIGS. 1 to 3 includes a heat pipe 15 which serves for cooling and condensing fuel vapors.

Heat pipes are known per se and usually have the shape of a tube with a hermetically sealed hollow inner volume which is partially filled with a liquid work or heat transfer medium. When one end of the heat pipe is positioned in an warmer environment then an opposite end of the heat pipe, an evaporation zone is established at the end which is positioned in the warmer environment in dependence on the ambient temperature when selecting an appropriate work or heat transfer medium, in which evaporation zone the work or heat transfer medium evaporates in the inner volume, while a condensation zone forms at the end which is positioned in the colder environment, in which condensation zone the evaporated work or heat transfer medium condenses again. The condensed work or heat transfer medium is transported back again into the evaporation zone by capillary action and if applicable supported by its gravity where it evaporates again. Since the heat pipe takes up heat from the area surrounding the evaporation zone during evaporation and releases heat into the area surrounding the condensation zone during condensation of the evaporated work and heat transfer medium, the heat pipe passively transports heat, i.e. without additional external energy input, from the evaporation zone into the condensation zone.

This effect is used in the exemplary embodiments in the FIGS. 1 to 3, to condense the hydrocarbons which outgas from the fuel in the fuel tank 1, or fuel vapors. For this purpose, the heat pipe 15 is arranged so that one of its end sections 16 which is to serve as evaporation zone, is located in the fuel tank 1 above the fuel level 9 in the gas volume 10, in which the outgassing hydrocarbons accumulate. The end section 16 which serves as evaporation zone, is slightly inclined downwards towards its free end, so that the hydrocarbons which condense on the outside of the evaporation zone 16 run off in the direction of the free end and from there drop into the fuel 2 in the fuel tank.

In the two fuel tanks in the FIGS. 1 and 2, the opposing end section 17 of the heat pipe 15 which serves as condensation zone is located outside of the fuel tank 1 in a region of the motor vehicle, whose temperature is lower than the temperature in the interior of the fuel tank 1, for example in a region which is exposed to the airflow or near a radiator of an air conditioner of the motor vehicle. For increasing the surface of the condenser zone 17 that is exposed to the airflow, the latter can be provided with radiator fins 18. In both cases the heat pipe 15 extends through a lid 19, which closes an opening 20 on the top side of the fuel tank 1.

In the exemplary embodiments in FIG. 3 the entire heat pipe 15, i.e. the evaporation zone 16 as well as the condensation zone 17, are located inside the fuel tank 1, wherein the condensation zone 17 is submerged in liquid fuel 2 near a bottom of the fuel tank, where the temperature of the fuel 2 is usually the lowest. The heat pipe 15 at this point is generally bent C-shape, wherein the condensation zone 17 is generally oriented parallel to the bottom of the fuel tank.

Figure 4:
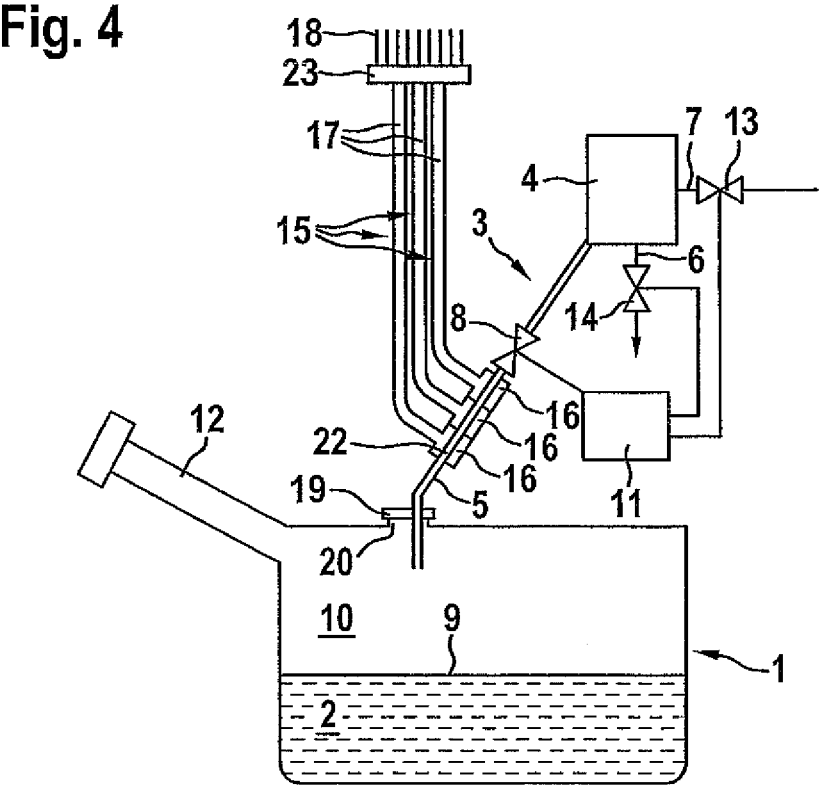
FIG. 4 a schematic vie of a fuel tank of a motor vehicle with a tank ventilation device and a heat pipe for condensing fuel vapors in a tank ventilation line of the tank ventilation device.
Figure 5:
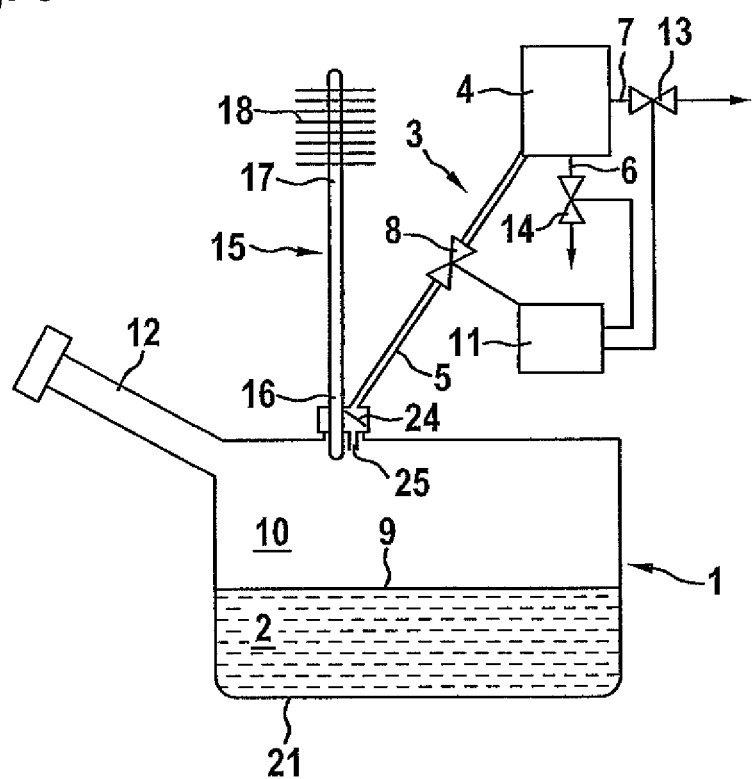
FIG. 5 a schematic view according to FIG. 4, however, with an additional liquid trap.

In the exemplary embodiment in FIGS. 4 and 5 the fuel vapors are not condensed inside the fuel tank 1 by the heat dissipation, but in the tank ventilation line 5 of the tank ventilation device 3. For this purpose, multiple parallel heat pipes 15 are provided in the exemplary embodiment in FIG. 4 whose evaporation zones 16 are arranged as hollow tube-shaped bodies one after another along a section 22 of the tank ventilation 5, which section is made of metal, and surround the section 22, to facilitate heat transfer at this location. The section 22 is arranged between the fuel tank 1 and the tank ventilation valve 8. The heat conducted away from the evaporation zone 16 by the heat pipe 15, leads at this location to condensation of a part of the fuel vapors, which flow through the tank ventilation line 5 in the direction of the activated carbon filter 4 especially when the tank ventilation valve 8 is open so that less hydrocarbons (HC) reach the activated carbon filter 4. However, fuel vapors also condense at this location when the tank ventilation valve 8 is closed, and advance by diffusion from the fuel tank 1 as far as into the section 22 of the tank ventilation line. The condensing fuel flows through the tank ventilation line 5 which is tilted downward towards the fuel tank 1, back into the fuel tank 1. The condensation zones 17 of the heat pipes 15 are connected by a body 23 which is provided with cooling fins 18, and is located in a low temperature region of the vehicle.

In the exemplary embodiment in FIG. 5 fuel vapors are also condensed with a heat pipe 15 in a section 22 of the tank ventilation line 5 in order to reduce the amount of the gaseous hydrocarbons that reach the activated carbon filter 4. At this location the section 22 includes a liquid trap 24 which is cooled by the evaporation zone 16 of the heat pipe 15. The condensed liquid fuel can accumulate in the liquid trap 24 so that when the tank ventilation valve 8 is open, it cannot be carried along by the gas mixture which flows through the tank ventilation line 5 in the direction of the activated carbon filter 4. The liquid trap 24 is arranged above the lid 19 and is connected to the interior of the fuel tank 1 by a fuel line 25 which extends through the lid, through which fuel line 25 the liquid fuel can flow from the liquid trap 24 back into the fuel tank 1.

With the above described heat pipes 15 a high heat flux density and with this a high power density of the heat transfer can be achieved without requiring energy for the circulation of the work or heat transfer medium.

What is claimed is:

1. A device for cooling fuel for an internal combustion engine, comprising a heat pipe having an evaporation zone and a condensation zone, said evaporation zone being in thermal contact with fuel vapors along a tank ventilation line which leads from a fuel tank of the internal combustion engine to an activated carbon filter, said evaporation zone surrounding a section of the tank ventilation line made of metal for condensing a portion of the fuel vapors.

2. The device of claim 1, wherein the evaporation zone is in thermal contact with the fuel vapors between the tank and a tank ventilation valve which is arranged in the tank ventilation line.

3. The device of claim 1, wherein the condensation zone is arranged in a region cooled by a passing air flow.

* * * * *